B. HARTMAN.
COMBINED AUTOMOBILE AND MOTOR BOAT.
APPLICATION FILED JAN. 28, 1909.

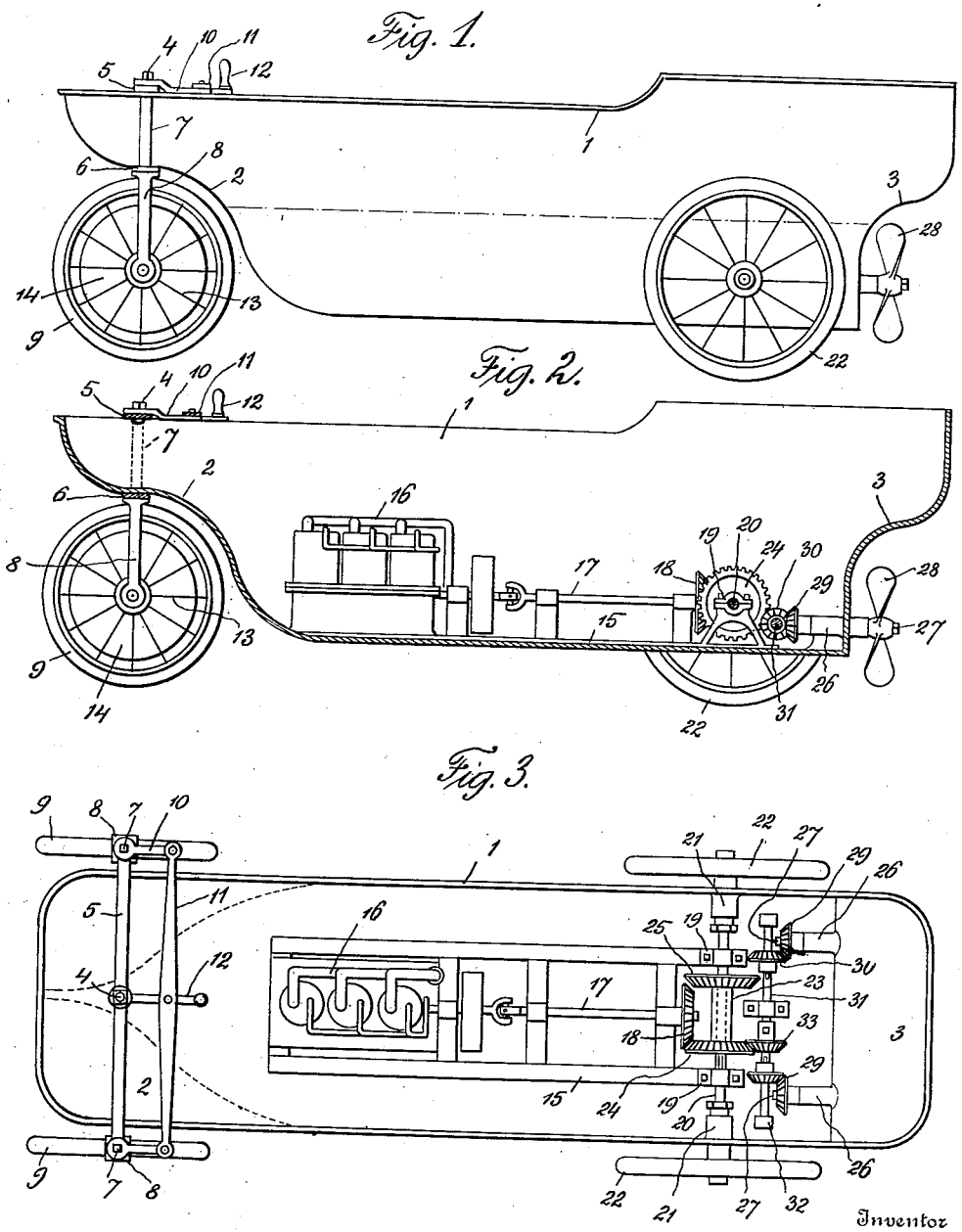

921,396.

Patented May 11, 1909.
2 SHEETS—SHEET 2.

Witnesses
A. H. Rabsag,
R. H. Butler

Inventor
B. HARTMAN
By H. C. Evarts
Attorneys

UNITED STATES PATENT OFFICE.

BRUNO HARTMAN, OF EAST PITTSBURG, PENNSYLVANIA.

COMBINED AUTOMOBILE AND MOTOR-BOAT.

No. 921,396.  Specification of Letters Patent.  Patented May 11, 1909.

Application filed January 28, 1909. Serial No. 474,661.

*To all whom it may concern:*

Be it known that I, BRUNO HARTMAN, a citizen of the United States of America, residing at East Pittsburg, in the county of Allegheny and State of Pennsylvania, have invented certain new and useful Improvements in a Combined Automobile and Motor-Boat, of which the following is a specification, reference being had therein to the accompanying drawing.

This invention relates to a combined automobile and motor boat, and the object of the invention is to provide an automobile with means to travel on land as well as in water, and is therefor advantageous for the transportation of army supplies or for operation in an army.

I attain the above object by constructing an automobile body in the form of a non-leakable boat, and provide the automobile with propellers adapted to be driven when the automobile enters a stream of water. A convenient form of engine is employed for operating the automobile on land or water and a clutch used for controlling the operation of the rear axles of the automobile or propellers thereof.

The invention will be hereinafter described in detail and then specifically claimed.

Figure 4:
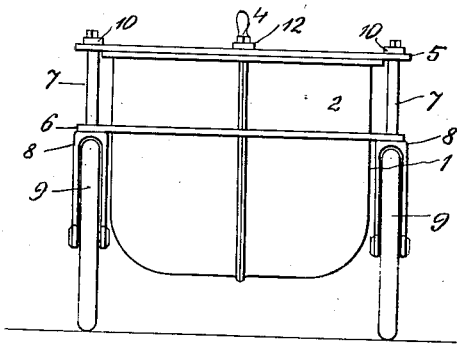
Figure 5:
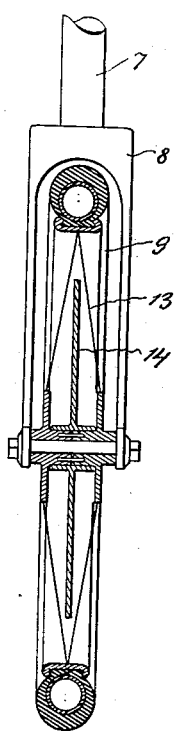

In the drawings, Figure 1 is a side elevation of an automobile constructed in accordance with my invention, Fig. 2 is a longitudinal sectional view of the same, Fig. 3 is a plan of the combined automobile and motor boat, Fig. 4 is a front elevation of the same, Fig. 5 is an enlarged sectional view of one of the steering wheels of the automobile.

In the accompanying drawings 1 designates an oblong metallic vehicle body, having the forward end thereof conforming to the bow of a vessel, as at 2, and the rear end thereof shaped to conform to the stern of a vessel, as at 3.

Arranged in the bow 2 of the body 1, is a vertical shaft 4 connecting transverse beams 5 and 6, the former being arranged above the bow and the latter beneath the bow. The ends of the beams 5 and 6 protrude beyond the sides of the body and in the ends of said beams are journaled vertical posts 7 having the lower ends thereof provided with forks 8. In the forks 8 are journaled pneumatic rubber tired wheels 9 of a type common to automobiles and bicycles. The upper ends of the posts 7 are provided with cranks 10 connected by a bar 11 and connecting with said bar intermediate the ends thereof, is a steering lever 12 pivotally carried by the upper end of the shaft 4. The wheels 9 are provided between the spokes 13 thereof, with large metallic disks 14, and these disks serve functionally as rudders for steering the automobile when propelled through water.

Arranged longitudinally of the body 1 is an engine frame 15 supporting a conventional form of engine 16 for imparting a rotary movement to a shaft 17, which is provided with a beveled gear wheel 18. Contiguous to the stern 3, bearings 19 are arranged for a transverse shaft or axle 20 extending through stuffing boxes 21 carried by the sides of the body 1. The outer ends of the shafts 20 are provided with the ordinary and well known type of automobile or bicycle wheels 22. Upon the shaft 20, is slidably keyed a sleeve 23 adapted to rotate with said shaft, said sleeve having gear wheels 24 and 25 adapted to mesh with the gear wheel 18. In connection with the sleeve 23, a suitable mechanism can be used for shifting the same.

The stern 3 of the body 1 is provided with stuffing boxes 26 for propeller shafts 27. The outer ends of the shafts 27 are provided with propellers 28, while the inner ends thereof are provided with beveled gear wheels 29. Meshing with said beveled gear wheels 29 are similar wheels 30, mounted upon a shaft 31, journaled in bearings 32, arranged within the body 1 adjacent to the bearings 19. Upon the shaft 31 is mounted a beveled gear wheel 33 adapted to mesh with the beveled gear wheel 24.

Operation. As shown in Fig. 3 of the drawings, the shiftable sleeve 23 is in position for power to be transmitted from the shaft 17 to the shaft 31 through the medium of beveled gear wheels 18, 24 and 33, consequently the propellers 28 will be revolved to drive the body 1 through a stream or body of water. By shifting the sleeve 23, power can be transmitted from the shaft 17 to the shaft 20 and the body 1 driven over land.

While in the drawings forming a part of this application there is illustrated the preferred embodiments of my invention, I would have it understood that the details of construction can be varied or changed as to the shape, proportion and manner of assemblage without departing from the spirit of the invention.

Having now described my invention, what I claim as new, is:—

In a combined automobile and motor boat, the combination with a driven shaft, of a body supporting said shaft and having bow and stern ends, wheels movably supporting the bow ends of said body, disks arranged between the spokes of said wheels and serving functionally as rudders a shaft journaled transversely in said body adjacent to the stern end thereof, wheels mounted upon the ends of said shaft, a shiftable sleeve arranged upon said shaft, beveled gear wheels carried by said sleeve and adapted to be alternately driven by the first mentioned shaft, propeller shafts journaled in the stern end of said body, propellers carried by the outer ends of said shafts, a shaft revolubly supported by said body and adapted to be driven by one of the gear wheels of said shiftable sleeve, means for imparting a rotary movement from said shaft to said propeller shafts, and means for steering the wheels at the bow ends of said boat.

In testimony whereof I affix my signature in the presence of two witnesses.

BRUNO HARTMAN.

Witnesses:
A. H. RABSÁG,
MAX H. SROLOVITZ.